Patented Oct. 8, 1935

2,016,286

UNITED STATES PATENT OFFICE 2,016,286

PROCESS OF MAKING RUBBER CELLULOSE MIXTURE AND RESULTING PRODUCT

Michael Levin, Buffalo, N. Y., assignor of one-fourth to Jacob T. Basseches, New York, N. Y.

No Drawing. Application November 30, 1931, Serial No. 578,198

12 Claims. (Cl. 106—23)

This invention relates to a process of preparing a homogeneous rubber cellulose mixture and the resulting product.

The utility of cellulose as an ingredient in rubber has long been recognized and appreciated. Its incorporation in rubber in the filamentary form on mastication rolls or by direct admixture, though it may have met with considerable success, under constant use this material has been found gradually to separate from the rubber and disintegrate, undoubtedly due to the difference in physical properties of the ingredients and the non-homogeneous character of the mixture.

Attempts to mix cellulose in which the fibre is retained in its original form by admixture other than on masticating rolls, such as, for instance, for mixing an organic solvent solution containing rubber with cellulose has not been successful because of the high cost involved in first dissolving the rubber and then recovering the products and further because of the fact that the properties of rubber are lost when this compound undergoes solution and is again separated from the solvent.

Where I have attempted to prepare the incorporation of cellulose with rubber by mixing viscose with rubber and then regenerating the cellulose from the viscose, in accordance with the procedure ordinarily used for making artificial silk, I have found that the product recovered has an uneven distribution of the ingredients due to premature coagulation or coalescence of the rubber in suspension. While this procedure is suitable to some extent for making a waterproofed artificial silk, the use of this mixture in compounding the ingredients has not been attempted and it is not useful because of the non-homogeneous character which is produced by this process.

I have found that I can produce the admixture of cellulose to rubber without losing any of its physical properties by mixing a viscose preparation with a rubber suspension in a water vehicle, such as latex, and then simultaneously regenerating the cellulose and coagulating the rubber. The solid component recovered as a result of this process is completely regenerated cellulose evenly and uniformly distributed with rubber in a manner not heretofore attainable and so even that uneven dissemination is not capable of being detected even under the microscope.

In accordance with the preferred process, the cellulose and rubber mixture is recovered as a product which is highly granular and porous, which is suitable for further admixture with other rubber compounding ingredients and which will not be adversely affected or affect the additional rubber which may be added when mixed on the masticating rolls.

In one embodiment of my invention, preparation may be made as follows. Viscose is preferably first made from wood pulp. The usual strengths of alkali to produce sodium xanthogenate may be used and are suitable in my process. The period of aging of the viscose for purposes herein may be confined to a few days and I have found that two or three days aging is sufficient. The viscose solution first prepared is diluted to have approximately a 1% cellulose content. The rubber suspension is then added. This is preferably an ammoniated latex. The mixture so made is thoroughly mixed and, finally, for every pound of cellulose in the viscose solution, there is added one pound of calcium chloride. Preferably live steam is then run into the vessel containing the above mixture, the mixture being constantly stirred during this operation. Though heating may be effected to any desired degree, including boiling, preferably the temperature should be maintained at about 85° C.

As a result of the process above described, a product will be obtained comprising fine, granular material whose individual particles contain regenerated cellulose in which the rubber cellulose content is of extreme homogeneity. Preferably, these granules are thoroughly washed and thereafter dried, temperatures being used such as not to affect the rubber and for certain purposes vacuum drying at low temperatures is preferred. The product so formed can be milled on a regular milling machine as live crepe rubber to which may be added vulcanizing ingredients or accelerators or additional fillers, if so desired, in accordance with the character to be imparted to the final product, in accordance with well known practice.

As an additional example for the preparation of a desirable product 100 grams of cellulose in the form of viscose in 10,000 c. c. of water have added thereto 300 grams of latex (30% rubber and preferably ammoniated). Thereafter there is added 100 grams of calcium chloride. This mixture may be steam heated, preferably by passing live steam directly therethrough for a period of about 1 hour and there will be recovered a product of about 200 grams of cellulose and rubber.

A product having highly desirable characteristics may be obtained by adding to the rubber cellulose mixture so recovered 1 gram of accelerator, 5 grams of zinc oxide and 3 grams of sulphur. Final admixture may be had upon the mixing rolls. To the mixture thus prepared there may be added any additional quantity of rubber.

Though I have described the preparation of a rubber cellulose mixture containing equal parts of cellulose and rubber, any desired quantity of cellulose may be incorporated by varying the dilution or concentration of the viscose that is used. It will also be noted that though I have described the incorporation of additional agents after the rubber cellulose solids are collected that I may incorporate the modifying agents before applying the heat and this may be accomplished by incorporating the fillers, accelerators or vulcanizing agents to the rubber suspension that may be used, including its addition, before admixture with the viscose.

It will be further noted that though I have described calcium chloride as the desirable ingredient prior to the collection of the solids of cellulose and rubber, that other salines may be used to obtain, to some extent, desirable results and for this purpose I may add zinc chloride, barium chloride or magnesium chloride.

It will be further observed that for certain purposes I may use a viscose preparation made from the crudest ingredients otherwise unsuitable for spinning of artificial silk or other materials made wholly of viscose, and, further, in this ingredient it is not necessary to completely age for periods of two or three days or more but that in certain cases I have found that aging over night is sufficient for my purposes.

In the disclosure above, I have referred to calcium chloride as the preferred latent coagulant being one of the salines of a group of materials including the alkaline earth metal chloride. These salines I have found desirable because with the solution of viscose, they form a latent coagulable mixture with the dispersion of rubber. I have found that this latent coagulable mixture, including a solution of dispersion of a cellulosic compound, a dispersion of rubber, and a latent coagulant is dependent upon the degree of concentration of the cellulosic material and the coagulant, so that an intimate admixture may be obtained by stirring without any preliminary evidence of coagulation, tending to regenerate the cellulose and precipitate the rubber, until heat is applied. Thus I have found that solutions of sulphuric acid, hydrochloric acid, acetic acid, ammonium sulphate, or mixtures of sulphuric acid and magnesium sulphate, or sulphuric acid, sodium sulphate, zinc sulphate, or either of the sulphate salts, with or without the addition of sulphuric acid, may be used as latent coagulants to form a latent coagulable mixture of the cellulosic solution, such as viscose and a dispersion of rubber, in an intimate admixture before applying the heat in accordance with the method previously described, and obtain, upon heating, a precipitate of an intimate admixture of rubber and regenerated cellulose in a flocculent form of the precipitate which, in accordance with my disclosure, is peculiarly suitable for preparing rubber products or compounding with further quantities of rubber. The product is in a form which may be readily washed free of the soluble materials which may be detrimental in the final product.

In the use of the latent coagulants above mentioned, the concentration of the reagent which may be intimately mixed with a mixture of a cellulosic compound and a dispersion of rubber is preferably one which is less than about 5%. The amount added is such that the coagulant represents by weight, the amount equal to the viscose in the dispersion, or that the viscose be in exceedingly dilute solutions of below that which it has been experienced is necessary for spinning in making artificial silk. Thus, in using sulphuric acid, a concentration up to about 10% may be used, but under these conditions, the viscose solution is required to be extremely dilute. A half of one percent solution of viscose with the dispersed rubber is preferred where a concentration of sulphuric acid of 10% is used. If the viscose solution is up to as high as 5%, a 10% solution of sulphuric acid will cause a preliminary regeneration of the cellulose and will not form a latent coagulable mass of a dispersion of rubber viscose and therefore produce a mixture unsuitable for my purposes. As previously indicated, the latent coagulable mixture of viscose dispersed rubber and the coagulant, includes one in which the viscose is less than 5%, and the coagulant less than 5%, these figures being calculated on the total aqueous mixture of rubber.

It is to be observed that where I prefer to use solution of dispersion of cellulosic material, this includes cellulose which may be the fibers obtained from scrap rubber and portions only thereof, converted to the alkali xanthogenate, the remaining portion of the threads remaining unchanged, or as the alkali cellulose.

Though I have previously indicated as the preferred form, viscose from wood pulp or cotton linters, I may obtain the viscose dispersion from scrap regenerated cellulose, such as scrap cellophane or other sources of regenerated cellulose products, such as obtained from rayon factories, the waste product being filaments, sheets, or threads of artificial silk, or cuttings, clippings and films of regenerated cellulose, with or without a waterproofing agent.

This source of cellulose for the preparation of the viscose component has certain preferred advantages, in that the xanthated mixture formed does not require seasoning or aging, as in the case when viscose is made from wood pulp, or cotton linters and, further, in the speed with which this source of cellulose may be dissolved in the alkali, or result in the formation of the xanthated dispersion.

In the preparation of a xanthated dispersion under this method, I may also use the waste caustic soda solutions obtained from rayon plants or sheeted regenerated cellulose films, in which viscose is made into artificial silk or sheets, resulting in a caustic soda solution of about 16%. This caustic soda solution is strengthened by the addition of 2% pure caustic soda to bring the total amount of caustic soda to 18%.

In the preparation of viscose from regenerated cellulose scrap, such as cellophane scraps, artificial silk scraps, I take 100 pounds of this regenerated cellulose scrap and add 2 pounds of caustic soda of 18%, or of a specific gravity of 1.20. This is mixed for about ten minutes and there is then added from 30 to 40% of the total cellulose content by weight, carbon bisulphide, to form the alkali xanthate. The alkali and carbon bisulphide may be added by successive steps, or by simultaneously adding the alkali solution and the carbon bisulphide. In the preferred practice, I then dilute this xanthated solution of cellulose, or viscose, by the addition of water until the viscose constitutes about 1%, and this procedure applies where there is present alkali solution and undissolved cellulose.

This mixture is now ready for addition to a dispersion of rubber or latex, in accordance with the method first described. A latent coagulable mixture is then made by the addition of the saline or acid solution, by constantly stirring an intimate admixture of the dilute solution of either the alkaline earth metal chloride, the preferred ingredient being calcium chloride, or one or more of the dilute solutions of the latent coagulants previously enumerated. By thorough stirring, an intimate mixture is obtained without preliminary coagulation or regeneration of the cellulose. The coagulant is then activated by passing live steam in the mixture, or by otherwise heating the mixture to simultaneously precipitated and regenerated cellulose and rubber in an intimate admixture. The mixture is preferably constantly stirred during the heating operation. Separation of the regenerated cellulose and other cellulosic products and rubber is then effected by filtration, the mixture so separated being finely divided, light and porous and is easily washed free of the soluble materials.

I have previously indicated that the latent coagulable mixture as prepared by me, may include cellulosic solution or dispersion, preferably viscose or alkali xanthogenate with a dispersion of rubber, such as latex, and the dilute solution of the latent coagulant, preferably calcium chloride.

Though latex is preferred, the dispersion of rubber may be artificially prepared, simultaneously with the formation of the cellulosic dispersion, or solution, or this may be separately prepared, and then mixed with an aqueous dispersion of rubber.

I will now describe a method for preparing a dispersion of rubber, which may be substituted, in whole or in part, for the latex component. This dispersion, though peculiarly suitable for producing a latent coagulable mixture from which there may be obtained an intimate mixture of cellulose or a cellulosic compound and rubber, finds equal utility as an adhesive, per se, or as an impregnating solution, wherever the use of a dispersion of rubber may be found desirable, such as for impregnating cloth, fibrous materials, artificial cork compositions, artificial wood compositions, as a binder for abrasives for uniting sheets, in making laminated fabrics or cardboard, fiber board, or artificial wood, and similar uses.

As one form of an embodiment of the method preferred by me for preparing this dispersion, I mill crude rubber upon a rubber mill in which the rolls are cooled to about 150 degrees F., to thoroughly masticate the rubber. Reclaimed rubber in about equal parts to the crude rubber used, is then added, and then whiting or similar filler is added, and the entire amount is thoroughly mixed. The filler or whiting may constitute one half of the combined rubber content mentioned, the combined rubber content for purposes of the batch to be described is in the proportion of 800 grams.

Separately, I prepare an emulsion in the proportions of 100 grains rosin, 100 grams cymene, 10 grams caustic soda and 100 c. c. water. This emulsion is placed in an internal mixer and heat is applied.

The rubber compound first prepared is cut into small strips and added to the internal mixer, which already includes the emulsion. During the mixing of the emulsion and the rubber by the blades contained in the internal mixer, a loose cover may be placed over the vessel to prevent loss of water or cymene from the emulsion. The operation of the internal mixer is continued until the emulsion and rubber compound has formed a homogeneous, smooth mass. At this point the heat is discontinued, and then water containing additional cymene is slowly added. A solution made in the proportions of 500 c. c. of water, 50 grams of cymene, is one that is preferably used. The smooth mass originally made may have added to it the quantity of water without the cymene, to obtain a thin, readily flowable dispersion. The addition of water is in accordance with the percentage of rubber that it is desired to have in the final dispersion. The percentages of rubber above referred to, with the quantity of water, will give a dispersion in which the rubber solids content is approximately 57%.

The inclusion of cymene in the additional quantity of water added, lowers the viscosity of dispersion and the ability of the dispersion to carry the higher concentrations of rubber. This mixture may be used as the source of the dispersion in making a rubber cellulose compound previously mentioned, or may be used by itself, as an adhesive, as already stated. When used as a coating material for applying to cloth, the cymene appears to facilitate penetration and eliminates excessive shrinkage when the water content is separated from the coating applied to the cloth backing, by drying.

As a further embodiment of the invention of the method for making a dispersion, as above described, I separately prepare the following mixtures in the proportions—

A—500 grams of casein and 100 c. c. of water.
B—50 grams of solid caustic soda and 200 c. c. of water.

The mixture B is added to the mixture A, after the mixture A is allowed to soak over night. In the meantime there has been prepared the following—

C—300 grams of abietic acid, preferably rosin, and 100 grams of cymene.

This mixture C is heated to effect solution by the cymene of the abietic acid or rosin. The mixture made by combining A and B is then added to the mixture C, in an internal mixer, until a milk-white emulsion is formed. The emulsion so prepared is then heated, preferably by a steam heat jacket applied to the vessel, to warm up the vessel, and then the rubber component, whether crude or reclaimed, is gradually added and the mixing is continued until a homogeneous mass is formed. Preferably, the mixing is continued for from one to two hours. During the heating and mixing, it is preferred to keep the vessel forming the internal mixer, closed by covering it with a lid. No pressure is required. A temperature of between 80 to 100 degrees C. is preferably maintained. At the end of one to two hours (the longer period being utilized where reclaimed rubber is used), water is gradually added, depending upon the concentration of the dispersion which is desired, varying from 30 to 60% rubber solids in the final dispersion. The mass so prepared may be used in place of natural latex, in the methods previously outlined for preparing a rubber cellulose mass.

As a still further embodiment of the invention of the method for making a dispersion for the purposes described, I separately dissolve, preferably rosin, or abietic acid in cymene, by mixing the rosin with the cymene and heating. There is then added a quantity of alkali, such as caustic soda, to form a soap of rosin, and the mixture is thoroughly heated and mixed to form an emulsified mass. This mixture is placed in an internal mixer to which are added strips or cut pieces of rubber, either crude rubber or reclaimed rubber. As in the prior example, the mass is heated during vigorous stirring in the internal mixer, at a temperature between 80 and 100 degrees C., preferably closing the vessel, as in the previous example, by the weight of a loose lid. Within an hour's time, the cymene and the rubber and the rosin soap form a homogeneous mass, in which all the particles and the large pieces of rubber have disappeared, and the mass looks like a gelatinous mixture of glue. The steam used for heating the vessel is then turned down, whereupon I add an alkali solution of casein in the proportions to the other ingredients, as in the first cited example reciting the use of casein. The internal mixer is operated for from ten to fifteen minutes, whereupon water is gradually added and the rubber becomes a colloidal dispersion. Particularly prior to the addition of the casein, and up to the time when the casein is added, the rubber is in the external phase, but upon addition of the requisite quantity of water, the rubber becomes the internal phase.

The cymene has the valuable property of dissolving or dispersing rubber, particularly at elevated temperatures, and this I use to break down the resistance of the rubber, so that the soaps may enter the interstices of the rubber. In other words, the interfacial tension of the rubber is reduced, so that it permits the soaps to enter into the rubber and form a uniform mass.

In the preparation of raw rubber for forming dispersions for my purposes, whether crude rubber or reclaimed rubber, it is preferred to preliminarily mill the rubber which is to be added to the emulsifying ingredients at temperatures about or below 150 degrees F., in order to prevent the coagulation of the proteins naturally present in the rubber, and to prevent further polymerization of the isoprene in the rubber itself. Where reclaimed rubber and raw rubber are compounded, I adhere to the same principle. Though this may not be necessary where reclaimed rubber alone is used, it is preferred to follow this same practice. Preliminary preparation of the rubber in this way, at these low temperatures, renders the rubber particularly amenable to dispersion with greater speed and facility, particularly by the methods preferred by me.

As a still further embodiment of the invention of the method for making dispersions, I may take the soaps of rosin, or abietic acid, and casein, dissolved in cymene, to form an emulsion with water, thereby obtaining an emulsifying mixture to which rubber is added, to treatment of the mixture in the internal mixer to form a dispersion, as in the prior recited methods, or I may dissolve rosin or abietic acid in cymene, saponify the rosin or abietic acid with caustic soda, to form an emulsification of a soap of rosin or abietic acid in cymene, before dispersing rubber thereinto. The caustic soda is here present in excess, so that it may also saponify and dissolve the casein subsequently added thereto, in the internal mixer, and before adding the requisite quantity of water to form an aqueous dispersion.

I may further produce a marketable product useful in obtaining dispersing of rubber, by dissolving 50 to 100 parts of abietic acid, preferably, rosin, in 100 parts by weight of cymene, emulsified with an alkali solution of casein, or casein formed into a soap by caustic soda, or other alkali, the aqueous content being about 150 parts water. The quantity of caustic soda or alkali is about one fifth of the casein content, though sufficient caustic soda or alkali may be used to completely saponify the abietic acid and act as a solvent for the casein. This emulsion is stable and may be used where desired for addition, thereto of quantities of rubber, to form stable emulsions of rubber. Though this product so prepared has preferred and particular utility, because of its value in emulsifying rubber, it may also be used in forming dispersions of artificial resins, such as vinyl resins, phenolic condensation products, bitumens, asphalts and coal tar pitches, or tars.

For use in the rubber field, for which this marketable emulsion forms a preferred product, I may add before use in making rubber dispersions, in the product marketed, vulcanizing ingredients, such as sulphurs or sulphur products, together with or without anti-oxidants, accelerators, fillers, such as zinc oxide or whiting, and/or coloring ingredients. In this form of the marketable emulsifying composition, though it is preferred to include casein, this ingredient may be entirely omitted.

Though I prefer cymene as the particular desirable component in forming dispersions, in that it has the power to dissolve the rosin and cause a very intimate mixture of the abietic acid present in the rosin, with the rubber or with the cellulose mixture of rubber, where this is used, the terpene compounds, particularly when used in an alkali solution with casein and abietic acid, may also be used with considerable success. Compounds in which cymene is a constituent, may also be used with some degree of success, though cymene is preferred by me. I may also use the distillate obtained having the boiling point of about 175 degrees C., as a result of treating the mother liquor from the manufacture of sulphite pulp, using spruce pulp. The mother liquor is purified by treatment with sulphuric acid, and finally distilled. The distilled product contains orthometapara cymene, and may also be used for my purposes.

The rubber dispersion as made by me may be marketed in the form of a paste and spread wherever desired to be used, and the water separated either by air drying or heat drying, to activate the rubber into adhesiveness.

In the methods previously described, I have indicated as desirable in making a cellulose rubber compound, the procedure of which includes separately preparing the cellulosic solution or dispersion and the rubber dispersion before combining the two mixtures, and adding the coagulant to form a latent coagulable mixture containing the viscose or alkali xanthogenate, the dispersion or suspension of rubber, and the latent coagulant. This mixture is then to be heated to precipitate a quantity of regenerated cellulose with the rubber admixed therewith. I may, however, simultaneously form the cellulosic compound, suspension or dispersion of rubber, at one time, particularly where the source of the rubber which is used contains a quantity of cellulose, such as from scrap rubber from automobile tires, including from 20 to 50% of cellulose in the form of cotton threads.

In the preparation of this mixture, rubber reclaim containing 20 to 50% of cellulose is first preferably finely ground as fine as commercially possible, to pass through a screen of about thirty or forty mesh. The mixture so prepared is then treated, taking the proportions of about 60 pounds of the reclaim, and treating it with 60 pounds of caustic soda solution of a specific gravity of about 1.20. The mixture is then placed in a tumbling barrel or other suitable mixer, and to this is added carbon bisulphide in the proportion of 20 to 40%, preferably 40%, and passed upon the cellulose content of the scrap rubber, or reclaim. This forms an alkali xanthate in about three hours. A partial xanthating of the fibers contained in the cellulose rubber mass may also be desirable for certain purposes, where the cellulose in the filamentary form, may be desirable in the end product to add to the end product the benefit of the fibrous condition of the cellulose. In xanthating, care should be exercised to prevent the rubber which is present, from surrounding the alkalinized fibres ordinarily preventing proper xanthating with the carbon bisulphide.

As a variation of the process above described, the ground rubber scrap containing the cellulose may be treated with the alkali from thirty minutes to one hour, and then placed in a mixer or xanthating barrel to be aged for a few days and then xanthated after so aging, or as a further variation, the alkali and the carbon bisulphide necessary for xanthating may be added simultaneously.

In either of the methods stated above, after the viscose or alkali xanthate has been formed to the desired extent, the xanthated mixture will appear gelatinous in character. At this point the mixture is diluted so that the dissolved cellulose compound is less than 5%, preferably about 1% of the cellulosic compound in the aqueous medium. For every pound of the cellulose present, a pound of calcium chloride solution of a strength of 10% is added to form a latent coagulable suspension of rubber. I may, however, add the requisite quantity of calcium chloride as a 50% solution, preferring, however, the lower concentrations of calcium chloride, so that any tendency of the calcium chloride, to precipitate the mass, is retarded to as great an extent as possible. It is to be observed that the gelatinous content of the alkali xanthate facilitates the suspension of the rubber of the mass.

After dilution as above described, live steam is passed into the mass, preferably maintaining the mass at a temperature of about 85 degrees C. Coagulation then occurs, with regeneration of the xanthate to cellulose. The aqueous medium is then separated by decanting or filtration of the residue washed free from any soluble material, after which the mass is dried. At this point it may be milled with additional crude rubber, softeners, fillers, vulcanizing agents, accelerators, and usual rubber compound ingredients. After the mass has been washed and dried, I may devulcanize the rubber where crude scrap has been used, and this I may accomplish by adding to 100 pounds of the cellulose mixture as above described and as obtained from the drier, 3½% of rosin oil dissolved in 2% cymene. This is based upon the weight of the cellulose rubber mass. I may then add about 1% of a protein, such as blood albumen, which is added in the form of a solution in which the quantity of blood albumen is dissolved in three pounds of water. I thereafter add 5% of caustic soda. This is added in the form of a solution. The entire mass is then mixed thoroughly to form a uniform mixture, placed into pans and into an auto-clave for six hours, whereupon it is heated under pressures of about 120 pounds. This will serve to devulcanize the mass and render it adhesive. After this, the necessary sulphur content and other rubber compounding ingredients may be added, in the usual proportions, and may include anti-oxidants, accelerators, new rubber, fillers, such as whiting or zinc oxide, or coloring matter.

In certain of the phases of the process of making a dispersion, where casein is specified, a protein such as egg albumen, black blood albumen, or light colored blood albumen may be substituted with some degree of success, though casein is preferred. Under such conditions of operation, the alkali necessary for dissolving the casein may be omitted, and an aqueous admixture with the protein is made. The alkali content being such as is only necessary to saponify the rosin or abietic acid, where this is used.

It is contemplated by me, as a still further embodiment of my invention, to form a rubber cellulose mixture from scrap rubber containing fibre as obtained from old rubber tires, rubber hose, etc., without first separating the rubber from the cotton threads. This I may do as follows:—ground rubber scrap, such as old tires containing 20-50% of cotton thread is added to an internal mixer which contains the abietic acid soap, terpene or cymene compound, with or without casein, in the form of an alkali emulsion, as previously described by me. The internal mixer is operated with this rubber scrap to plasticize the rubber and cotton fibres and form a plastic mass with the cotton threads untreated. At this point there is added an 18% solution of caustic soda, sufficient in quantity to dissolve as much of the cellulose as it is desired to convert to the alkali cellulose. The mixing operation is continued until gelatinization of a predetermined proportion of the cotton has been accomplished. There is then added the amount of carbon bisulfide in accordance with prior described practice to xanthate the alkali cellulose that has been formed. At this point water is added to thin the mixture so that the xanthated cellulose is less than 5% aqueous mixture, preferably 1%.

At this point there is added the latent coagulant to form a latent coagulable mixture. This results in a mixture in which rubber is suspended with a dilute solution of viscose in intimate admixture with the latent coagulant.

Some of the fibrous cotton may remain unchanged, determined upon the degree of xanthating of the threads that may be desired. Then live steam is passed into the mixture to activate the latent coagulant and precipitate the solid components of rubber, regenerated cellulose, some alkali cellulose and untreated cotton, where this procedure has been adopted. The aqueous medium is decanted from the solid components or separated by filtration, then washed and dried and treated in accordance with the procedure already described, whereby the mass is directly utilized or further treated to devulcanize, render the same adhesive and adding vulcanizing ingredients, additional quantities of rubber, anti-oxidants, accelerators, etc.

The rubber cellulosic mass, as made in accordance with my present invention, particularly from the latent coagulable mixture of a dispersion of rubber cellulosic compound, particularly the alkali xanthated cellulose, such as viscose, and the latent coagulant, results in the product in which the regenerated cellulose is extremely uniformly admixed with the rubber. The product is particularly valuable, in that it is resistant to organic solvents, particularly gasoline, and where I have made hose for conducting gasoline or similar fuels or solvents, the swelling action of the rubber is reduced to the minimum, and the fuel will not have gumming characteristics when used. Furthermore the product is so resistant to the solvent action of organic solvents, such as gasoline used for fuels in internal combustion, that gasoline will in no way be discolored.

The rubber compound as made by me, when used for flooring or paving blocks, is particularly valuable in that, when wet, slipping is reduced to the minimum, without losing any of the valuable properties of the rubber component.

This application is a continuation in part of applicant's copending application Serial No. 102,049, filed April 14, 1926.

Having thus described my invention and illustrated its use, what I claim as new and desire to secure by Letters Patent, is—

1. The process of preparing a cellulose-rubber mixture which comprises mixing a solution of viscose with an aqueous suspension of rubber, adding a chloride of an alkaline earth metal without substantial separation of the solids, heating and recovering the solid components in situ.

2. The process of preparing a cellulose-rubber mixture which comprises mixing an alkaline aqueous solution containing cellulose dissolved therein with an aqueous suspension of rubber, adding a chloride of an alkaline earth metal without substantial separation of the solids, heating and recovering the solid components in situ.

3. The process of producing a cellulose-rubber mixture which comprises mixing an aqueous solution of cellulose in an alkaline solvent medium with an aqueous solution containing rubber suspended therein, then adding calcium chloride thereto to form an intimate admixture without substantial separation of the solids and depositing the solid components in situ by heating.

4. The process of producing a cellulose-rubber mixture which comprises mixing an aqueous solution of cellulose in an alkaline solvent medium with an aqueous solution containing rubber suspended therethrough, then adding calcium chloride thereto to form an intimate admixture without substantial separation of the solids and depositing the solid components in situ, heating by passing live steam into the mixture.

5. The process of producing a cellulose-rubber mixture which comprises mixing a solution of viscose with an aqueous suspension of rubber, adding calcium chloride in amounts corresponding substantially to the weight of cellulose in solution and passing steam into the mixture and separating an admixture of cellulose and rubber therefrom.

6. The process of producing a cellulose-rubber mixture which comprises mixing an aqueous solution of cellulose in an alkaline solvent medium and an aqueous suspension of rubber in the presence of calcium chloride intimately admixed therewith, adding compounding ingredients, accelerators and separating the solid components in situ.

7. The process of preparing a cellulose rubber mixture including 5 to 75% of regenerated cellulose, 25 to 95% rubber, which includes intimately mixing an aqueous solution of cellulose in an alkaline solvent medium and an aqueous suspension of rubber having the above solids, adding a latent coagulant soluble salt which may be activated to form a coagulant and heating to simultaneously precipitate and regenerate cellulose and rubber in situ, separating the solid components and consolidating the mixture so collected by pressure.

8. The process of preparing a rubber cellulose mixture which comprises heating an intimate and uniform aqueous mixture of the following ingredients; an aqueous rubber dispersion, viscose and an acid generating ingredient in concentrations in the aqueous medium insufficient to coagulate the solids but capable upon heating to act as a coagulant, thereby forming a latent coagulable mixture, without substantial precipitation of the solid components and precipitating the rubber and rubber cellulosic components in situ upon continued heating.

9. The process of preparing a rubber cellulose mixture which comprises making an intimate mixture by stirring of viscose with an aqueous dispersion of rubber, uniformly admixing therewith a latent coagulant soluble salt which may be activated to form a coagulant without precipitation of the solids of the aqueous mixture and then coagulating and precipitating the cellulose and rubber solids in situ by heating the mixture.

10. The process of preparing a rubber cellulose mixture, which comprises intimately mixing a solution of viscose which has been diluted substantially and to about 1% cellulose content, with an aqueous disperson of rubber, thoroughly mixing the mixture so prepared, adding a soluble salt which may be activated to form a coagulant, comprising calcium chloride, heating the mixture while stirring the same, and precipitating regenerated cellulose and rubber, in intimate admixture, and then separating the solids so precipitated from the aqueous solutions.

11. The method of forming rubber-cellulose precipitants from an aqueous dispersion of rubber and a solution of cellulose in an alkaline solvent medium, characterized by dispersing through the mixture aforesaid a latent coagulant, under temperature conditions ineffective as a coagulant, distributing said latent coagulant through the mixture, then raising the temperature of the thus-formed mixture to a point at which the latent coagulant is effective, to regenerate the cellulose and precipitate the rubber in intimate admixture with each other.

12. The method of forming rubber-cellulose precipitants from latex and a solution of cellulose in an alkaline solvent vehicle, which is characterized by dispersing a latent coagulant through the mixture under temperature conditions which constitute it ineffective as a coagulant, then raising the temperature of the thus-formed mixture to a point at which the coagulant is effective to precipitate the rubber solids and regenerate the cellulose in intimate admixture in situ.

MICHAEL LEVIN.